US011990268B2

(12) United States Patent
Mousavi et al.

(10) Patent No.: US 11,990,268 B2
(45) Date of Patent: May 21, 2024

(54) TRANSFORMER COMPRISING WINDING

(71) Applicant: HITACHI ENERGY LTD, Zürich (CH)

(72) Inventors: Seyed Ali Mousavi, Västerås (SE); Göran Eriksson, Västerås (SE); Manoj Pradhan, Västerås (SE); Anders Daneryd, Västerås (SE)

(73) Assignee: HITACHI ENERGY LTD, Zurich (CH)

( * ) Notice: Subject to any disclaimer, the term of this patent is extended or adjusted under 35 U.S.C. 154(b) by 0 days.

(21) Appl. No.: 18/034,542

(22) PCT Filed: Feb. 4, 2022

(86) PCT No.: PCT/EP2022/052787
§ 371 (c)(1),
(2) Date: Apr. 28, 2023

(87) PCT Pub. No.: WO2022/167622
PCT Pub. Date: Aug. 11, 2022

(65) Prior Publication Data
US 2023/0395315 A1 Dec. 7, 2023

(30) Foreign Application Priority Data
Feb. 5, 2021 (EP) .................................... 21155612

(51) Int. Cl.
*H01F 27/28* (2006.01)
*H01F 27/36* (2006.01)
*H01F 27/34* (2006.01)

(52) U.S. Cl.
CPC ....... *H01F 27/366* (2020.08); *H01F 27/2828* (2013.01); *H01F 27/2885* (2013.01); *H01F 2027/348* (2013.01)

(58) Field of Classification Search
CPC ............... H01F 27/366; H01F 27/2828; H01F 27/2885; H01F 2027/348
See application file for complete search history.

(56) References Cited

U.S. PATENT DOCUMENTS 3,748,617 A * 7/1973 Crouse ................. H01F 27/343
336/187
3,750,070 A 7/1973 Rissinger
(Continued)

FOREIGN PATENT DOCUMENTS

JP S51149523 A 12/1976
JP S6199314 A 5/1986
(Continued)

OTHER PUBLICATIONS

International Search Report and Written Opinion of the International Searching Authority, PCT/EP2022/052787, dated May 19, 2022, 17 pages.
(Continued)

*Primary Examiner* — Tuyen T Nguyen
(74) *Attorney, Agent, or Firm* — Sage Patent Group

(57) ABSTRACT

A transformer comprising a core and winding wound around a winding axis extending along a limb of the core, said winding terminating in an axial end surface extending in a direction perpendicular to said winding axis, said transformer comprising a ring comprising magnetic material, said ring being located outside said winding and adjacent to said axial end surface. The ring comprises a set of magnetic metal components, such as magnetic metal sheets, said magnetic metal components being distributed about the winding axis and electrically insulated from each other. The core comprises a yoke, said yoke extending radially across the ring, at one or more crossing locations, from a radial inside of the ring to a radial outside of the ring. The cross-sectional height of the ring varies about the winding axis such that magnetic
(Continued)

metal components at the crossing locations have lower height along the winding axis than magnetic metal components further away from the crossing locations.

20 Claims, 11 Drawing Sheets

(56) References Cited

U.S. PATENT DOCUMENTS

| | | | | |
|---|---|---|---|---|
| 3,983,523 | A * | 9/1976 | Ayers | H01F 27/363 336/84 R |
| 4,021,764 | A * | 5/1977 | Winn | H01F 27/36 336/84 R |
| 4,317,096 | A | 2/1982 | Degeneff et al. | |
| 7,808,351 | B2 | 10/2010 | Forsberg et al. | |
| 10,468,178 | B2 * | 11/2019 | Kainaga | H01F 27/327 |
| 10,665,382 | B2 * | 5/2020 | Miyamoto | H01F 27/06 |
| 2018/0204670 | A1 | 7/2018 | Miyamoto et al. | |

FOREIGN PATENT DOCUMENTS

| | | | |
|---|---|---|---|
| JP | H02148811 | A | 6/1990 |
| JP | 2012028642 | A | 2/2012 |
| WO | 9928926 | A2 | 6/1999 |
| WO | 2010094671 | A1 | 8/2010 |
| WO | 2010102659 | A1 | 9/2010 |
| WO | 2019179808 | A1 | 9/2019 |

OTHER PUBLICATIONS

Korean Decision for Grant of Patent, Korean Application No. 10-2023-7015243, mailed Sep. 21, 2023, 4 pages.

* cited by examiner

TRANSFORMER COMPRISING WINDING

CROSS REFERENCE TO RELATED APPLICATIONS

This application is a 35 U.S.C. § 371 national stage application of PCT International Application No. PCT/EP2022/052787 filed on Feb. 4, 2022, which in turn claims priority to European Patent Application No. 21155612.1, filed on Feb. 5, 2021, the disclosures and content of which are incorporated by reference herein in their entireties.

TECHNICAL FIELD

The present disclosure relates to transformers. In particular it relates to transformers for application in power grid systems, for example it relates to high voltage transformers.

BACKGROUND

Transformers are used in power systems for voltage level control. In particular, a transformer is used to step up and step down voltage in electric power systems in order to generate, transmit and utilize electrical power. In general, a transformer comprises a core and windings.

In an ideal transformer model, it is assumed that all flux generated by the windings link all the turns of every winding, including itself. In practice however, some flux traverse paths that take it outside the windings. Such flux is termed leakage flux.

The leakage flux of transformer windings has a tendency to bend radially at the ends of the winding segments on top and bottom of the windings. The bending of the leakage flux is the origin of some specific issues for power transformers. These bent fluxes create a radial component of magnetic flux density at the areas close to the winding ends. The radial flux density generates radial eddy current losses, i.e., the enhanced loss caused by the radial flux and contributes to both overall load loss and local losses that may lead to a hot-spot problem. The other effect of the radial flux densities is that they may generate axial forces applied to the ends of the winding. These electromagnetic forces are creating considerable force under short-circuit conditions. In addition, the axial forces are the main source of winding vibration and resultant load noises.

WO2019179808 discloses an electromagnetic induction device comprising a magnetic core having a limb and at least one winding wound around the limb. The winding comprises an electrical conductor forming a plurality of radially overlapping layers around an axis, an electrically insulating material positioned between the radially overlapping layer of the electrical conductor, at least one magnetic material end-fill positioned at at least one axial end of the winding.

U.S. Pat. No. 3,639,872 discloses power transformers comprising plates of laminated magnetic material for collecting the leakage flux and leading it back to the iron core. The plates are covering end faces of the winding lying outside the yokes.

Electrostatic shields may be used for reducing and shaping electrical fields of the windings. Examples of such electrical shields are disclosed in e.g., U.S. Pat. No. 4,317,096 and US2010/0007452A1. U.S. Pat. No. 4,317,096 discloses a transformer winding comprising an electrostatic shielding ring and further comprising shields between the turns of adjacent winding sections. US2010/007452A1 discloses a transformer comprising an insulation for insulation of a winding end, the insulation including a shield ring arranged above the winding end.

Earlier solutions to reduce noise have sometimes been to provide noise shielding, such as noise reducing panels. This is cumbersome and increases the footprint of a transformer.

However, despite proposed prior art solutions, there remains needs to be met relating to the leakage flux of transformer windings.

There is a need to provide a transformer with reduced load noise.

There is a need to provide a transformer with reduced radial eddy losses.

There is a need to provide a transformer wherein an improved insulation design of the winding is obtained.

There is a need to reduce the cost of a transformer.

There is a need to provide a transformer with increased reliability.

SUMMARY

It is an object with the present disclosure to provide a transformer alleviating one or more of the needs discussed above.

According to a first aspect, the present disclosure relates to a transformer comprising a core and at least one winding wound around a winding axis extending along a limb of the core, the winding terminating in an axial end surface extending in a direction perpendicular to the winding axis, the transformer comprising a ring comprising magnetic material, the ring being located outside the winding and adjacent to the axial end surface, wherein a projection of the ring, along the winding axis, onto the winding, covers at least a part of, preferably all of, the axial end surface.

The core further comprises a yoke, said yoke extending radially across the ring, at one or more crossing locations 1300, from a radial inside of the ring to a radial outside of the ring.

The ring of magnetic material at least partly covering the axial end surface of the winding will work as a magnetic shield. This will reduce the radial eddy current losses.

With ring is meant a continuous ring about the winding axis. The ring may be regular, for example circular or elliptic.

Radial flux densities generate axial forces applied to the ends of the winding. The axial forces are the main source of winding vibration and resultant load noises. With the ring of magnetic material as disclosed herein such axial forces are avoided and thereby load noises will be reduced. Further, the electromagnetic forces are creating considerable force under short-circuit conditions. Axial short-circuit forces may be reduced on windings by the ring of magnetic material as disclosed herein.

The magnetic material may be in the form of magnetic metal components, which may comprise magnetic metal sheets.

The ring comprises a set of magnetic metal components, such as magnetic metal sheets, the magnetic metal components being distributed about the winding axis and electrically insulated from each other. In other words, the magnetic metal components may be arranged such that a path along a shape uniform with the ring around the winding axis intersects a plurality of the magnetic metal components.

Heights along the winding axis of respective ones of the magnetic metal components, varies about the winding axis such that magnetic metal components by the crossing location(s) 1300 have lower height than magnetic metal components further away from the crossing location(s) 1300.

The heights of the magnetic metal members may be varied such that leakage flux is guided to the limb and yoke rather than to any other magnetic structure around.

The magnetic metal components may be electrically conductive.

The path having a shape uniform with the shape of said ring means that the path has the same shape as e.g., the outer contour of the ring, although not necessarily the same size. For the path to have a shape uniform with the shape of said ring around the winding axis, the winding axis should be positioned in relation to the path in a similar manner as in said ring.

Optionally, said path may be circular.

Optionally, said path may be elliptical.

The magnetic metal components in the ring results in reduction of radial leakage flux and will direct radial leakage flux to an axial flow.

With magnetic material is meant herein a material that has a relative magnetic permeability greater than 1. Optionally, the magnetic material has a permeability of at least 50.

The magnetic metal components may be steel components. Optionally, the magnetic metal components may be electrical steel components. For example, the magnetic metal components may be NO steel or GO steel components, NO: non-oriented; GO: grain-oriented.

The magnetic material may be a magnetic conducting material.

The magnetic metal components may be magnetic metal sheets.

The ring may comprise a plurality of magnetic metal sheets, each magnetic metal sheet extending in a height direction and having a magnetic metal sheet height, extending in a length direction and having a magnetic metal sheet length and extending in a width direction and having a magnetic metal sheet width, wherein the magnetic metal sheet width is smaller than each one of the magnetic metal sheet height and the magnetic metal sheet length. The ring may extend in a radial direction from an inner radial portion to an outer radial portion of the ring, each magnetic metal sheet being oriented in the ring such that: the height direction coincides with the winding axis and the length direction extends in a direction from the inner radial portion to the outer radial portion of the ring.

The ring comprising laminated magnetic metal sheets give improved reduction of radial leakage flow and has resulted in improved load noise reduction.

At least some of the magnetic metal sheets may be oriented in the ring such that the length direction extends along a radial direction of the ring. That is, the length direction of those sheets extends in parallel to a radius of the ring. Optionally, each magnetic metal sheet may be oriented in the ring such that the length direction extends along a radial direction of the ring.

The lamination direction, i.e., the normal direction of the magnetic metal sheets, may hence be in the circumferential direction of the ring.

This contributes to forming a ring with good flux collecting properties.

The magnetic metal sheets may preferably be laminated as densely as possible, so as to obtain as large amount of magnetic material as possible in the volume of the ring. The width or the thickness of the magnetic metal sheets may for example be from 0.025 to 0.33. Alternatively, the width may be from 0.10 to 0.30 mm. Alternatively, the width may be from 0.15 to 0.27. Alternatively, the width may be from 0.18 to 0.25 mm. The insulating material between the sheets may be a thin layer which has a thickness of a few % of the width of the magnetic metal sheets. The insulating layer may be applied to the magnetic metal sheets before assembly of the ring.

At least some of the magnetic metal sheets may have a magnetic metal sheet length which extends from the inner radial portion of the ring to the outer portion of the ring. Hence, such a magnetic metal sheet will extend all the way from the inner radial portion of the ring to the outer portion of the ring.

Optionally, at least the magnetic metal sheets of a first subset of the magnetic metal sheets may have a magnetic metal sheet length which extends from the inner radial portion of the ring to the outer portion of the ring.

Optionally, at least the magnetic metal sheets of a second subset of the magnetic metal sheets may have a magnetic metal sheet length which do not extend from the inner radial portion of the ring to the outer portion of the ring. For example, the magnetic metal sheets of the second subset may have a length shorter than the radial distance from the inner radial portion of the ring to the outer portion of the ring.

By interleaving magnetic metal sheets from the first subset with magnetic metal sheets from the second subset, magnetic metal sheets having a shorter length will appear between the sheets of the first subset of sheets having a length extending from the inner radial portion of the ring to the outer portion of the ring. This results in a more compact ring and a good flux collection may be achieved.

The magnetic metal components or magnetic metal sheets may be laminated with adhesive.

The adhesive will hold the sheets or magnetic metal components together and adhesive may fill up gaps between the magnetic metal sheets.

The magnetic metal components or magnetic metal sheets may be laminated in some other way than by adhesive. For example, the magnetic metal sheets or magnetic metal components may be clamped together.

Optionally, the ring may be arranged at a distance from an axial end surface of the winding, wherein for example the distance is less than 10 mm, or for example the distance is 0.2 to 10 mm.

The rings of magnetic material may be placed close to the winding ends without an insulating problem.

Optionally, the ring may have a cross-section in a direction coinciding with the winding axis having an outer periphery which is rounded.

The rounded form achieves a good insulation design. An improved electrical field in the area of the winding end is achieved. The electrical field at the end regions of the winding can be smoothened out by the present solution.

Optionally, the ring may be arranged so as to be equipotential with the winding. For example, the ring may be electrically connected to the winding ends.

Optionally, the ring may comprise conductive elements being electrically connected to the winding. For example, the conductive elements may be electrically connected to conductors on the winding ends. Optionally, the conductive elements may be arranged between the magnetic metal components or magnetic metal sheets. The conductive elements may be copper elements, preferably copper sheets. The copper components or copper sheets may be arranged between the magnetic metal components or magnetic metal sheets, and the copper components or copper sheets may be connected electrically to conductors on the winding ends.

Optionally, an electrically conductive layer, preferably an aluminium or copper layer may enclose the ring.

Optionally, an electrical insulation layer may enclose the electrically conductive layer. The electrical insulation layer may have a thickness of about 0.2 to 0.5 mm.

The winding may be any type of winding used in the art of transformers. For example, the winding may be a disc winding. The problems associated with leakage flux are generally more pronounced when the winding is a disc winding. The transformer with a ring as disclosed herein is thus particularly advantageous to use when the preferred winding of the transformer is a disc winding.

Optionally, the winding terminates at an additional axial end surface opposite to the axial end surface as seen along the winding axis, and the transformer comprises an opposite ring comprising magnetic material, the opposite ring being located outside the winding and adjacent to the additional axial end surface, wherein a projection of the opposite ring, along the winding axis, onto the winding, covers at least a part of, preferably all of, the additional axial end surface.

All of the features and advantages as explained herein with reference to a ring are naturally similarly applicable to an opposite ring as described in the above. Optionally, when the transformer comprises a ring and an opposite ring, the ring and the opposite ring may be similar and/or may be similarly arranged with respect to the winding or windings of the transformer.

Optionally, the winding is a first winding and the transformer further comprises a second winding wound around the winding axis, the second winding terminating in an axial end surface of the second winding extending in a direction perpendicular to the winding axis.

It has been found that when the transformer comprises a ring covering at least a part of, preferably all of the axial end surface of the first winding only, the result may be reduced leakage flux from the first winding and the second winding.

Optionally, a projection of the ring, along the winding axis, onto the second winding, covers also at least a part of, preferably all of, the axial end surface of the second winding.

Hence, the flux collecting effect may be improved by using a ring at least partly covering both the first winding and the second winding.

Optionally, the ring is a first ring and the transformer comprises a second ring comprising magnetic material, the second ring being located outside the second winding and adjacent to the axial end surface of the second winding, wherein a projection of the second ring, along the winding axis, onto the second winding, covers at least a part of, preferably all of, the end surface of the second winding.

All of the features and advantages as described herein relating to a ring or a first ring are naturally similarly applicable to a second ring.

For example, a second winding provided with a second ring may naturally be provided with a second opposite ring similarly to the opposite ring as described in the above.

Optionally, each of the first and second winding may be a primary winding or a secondary winding.

Optionally, the second winding may be a primary winding and the first winding may be a secondary winding.

Further, the transformer may comprise a tertiary winding. The same applies for a tertiary winding as for the first and second windings.

Optionally, the voltage ratings of one or more of the windings of the transformer are above 1 kV, such as that the voltage ratings of all of the windings of the transformer are above 1 kV.

BRIEF DESCRIPTION OF THE DRAWINGS

Aspects of the present disclosure will now be described more fully hereinafter with reference to the accompanying drawings showing variants of the disclosure.

In FIG. 13, some members of the two rings are hidden for illustrative purposes such that the magnetic metal components are more clearly shown.

All the Figures are schematic.

DETAILED DESCRIPTION

Figure 1:
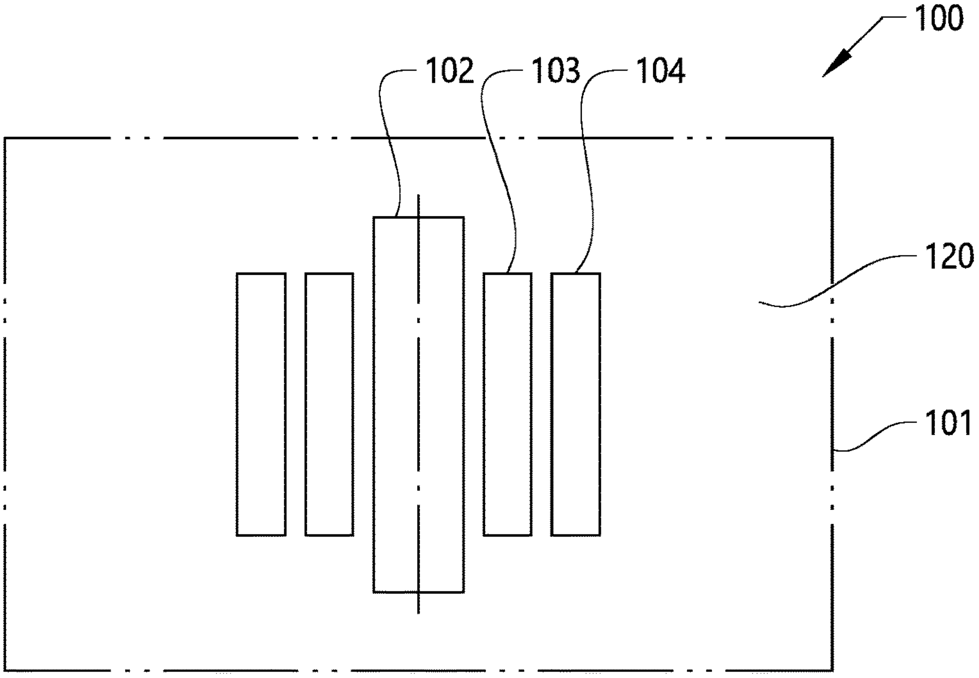
FIG. 1 is a cross-section of an example of transformer to which the present disclosure could be applied.

In FIG. 1 is a prior art transformer 100 described. The transformer is enclosed in a tank 101 which is filled with a dielectric fluid 120. The transformer 100 comprises a core 102 and windings 103, 104. The leakage flux of transformer windings may bend radially at the ends of the winding. Such radially extending leakage of flux may create axial forces on the winding which will lead to vibration of the winding. The vibration will be transmitted via the oil to the transformer tank 101 which will result in noise.

The following description will focus on arrangements adjacent the core and windings of a transformer. It is to be understood that the general features of a transformer such as the tank filled with dielectric fluid may be applied to all of the variants of the disclosure described herein.

The present disclosure relates to a magnetic ring which is arranged at an axial end of a transformer winding. By the present disclosure the radial leakage flux is reduced which in turn means that the noise is reduced. The rings of magnetic material will draw and catch the radial flux which will lead to a reduction of the axial forces. For example, it has been shown that a noise reduction by 6 dB can be obtained.

The magnetic material may be an electrical steel. The steel may be non-oriented (NO) steel or grain-oriented (GO) steel.

Figure 2:
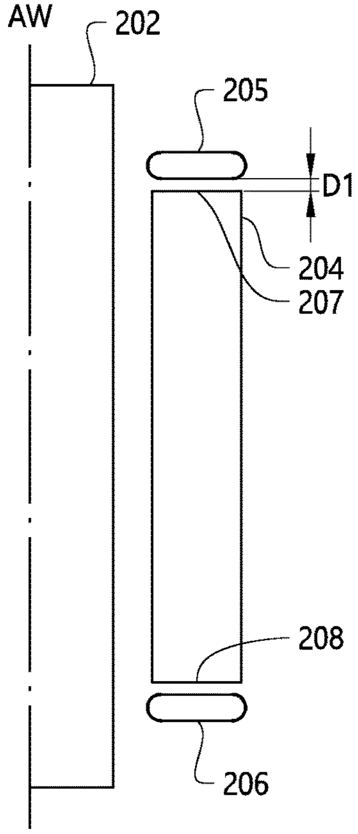
FIG. 2 shows cross-section of a part of a transformer according to a first variant of the present disclosure.

FIG. 2 schematically shows a part of a transformer. A cross-section of a half of a core 202 and a winding 204 is shown. The core 202 and the winding 204 are symmetrical around a winding axis AW shown in FIG. 2. The transformer comprises a winding 204 wound around a winding axis AW. The winding 204 terminates in an axial end surface 207, extending in a direction perpendicular to the winding axis AW. The transformer comprises a ring 205 comprising magnetic material, the ring 205 being located outside the winding 204 and adjacent to the axial end surface 207, wherein a projection of the ring 205, onto the winding 204, covers at least a part of, preferably all of, the axial end surface 207.

The ring will work as a magnetic shield. The ring will reduce radial eddy current losses. Thus, axial forces on the winding and thereby vibration will be avoided and noise reduction will be achieved.

Further, windings create radial flux density which generates radial eddy current losses. Those may lead to hot-spot problem. Radial eddy current losses at the end regions of the windings will be reduced when using a ring as disclosed herein. Hot-spot problems will thus be avoided when a ring of magnetic material is used as disclosed herein.

As illustrated in FIG. 2, the winding 204 forms the above-mentioned axial end surface 207 as well as a second, opposite additional axial end surface 208. The transformer may, as exemplified in FIG. 2 comprise a first ring 205 as described in the above arranged adjacent to the first axial end surface 207, and so as to cover at least a part of, preferably all of the first axial end surface 207, and a first opposite ring 206 as described in the above arranged adjacent to the additional axial end surface 208, and so as to cover at least part of, preferably all of the additional axial end surface 208.

The ring or rings 205, 206 may comprise a set of magnetic metal components, the magnetic metal components being arranged such that a circular path along the ring around the winding axis AW intersects a plurality of the magnetic metal components.

Figure 3:
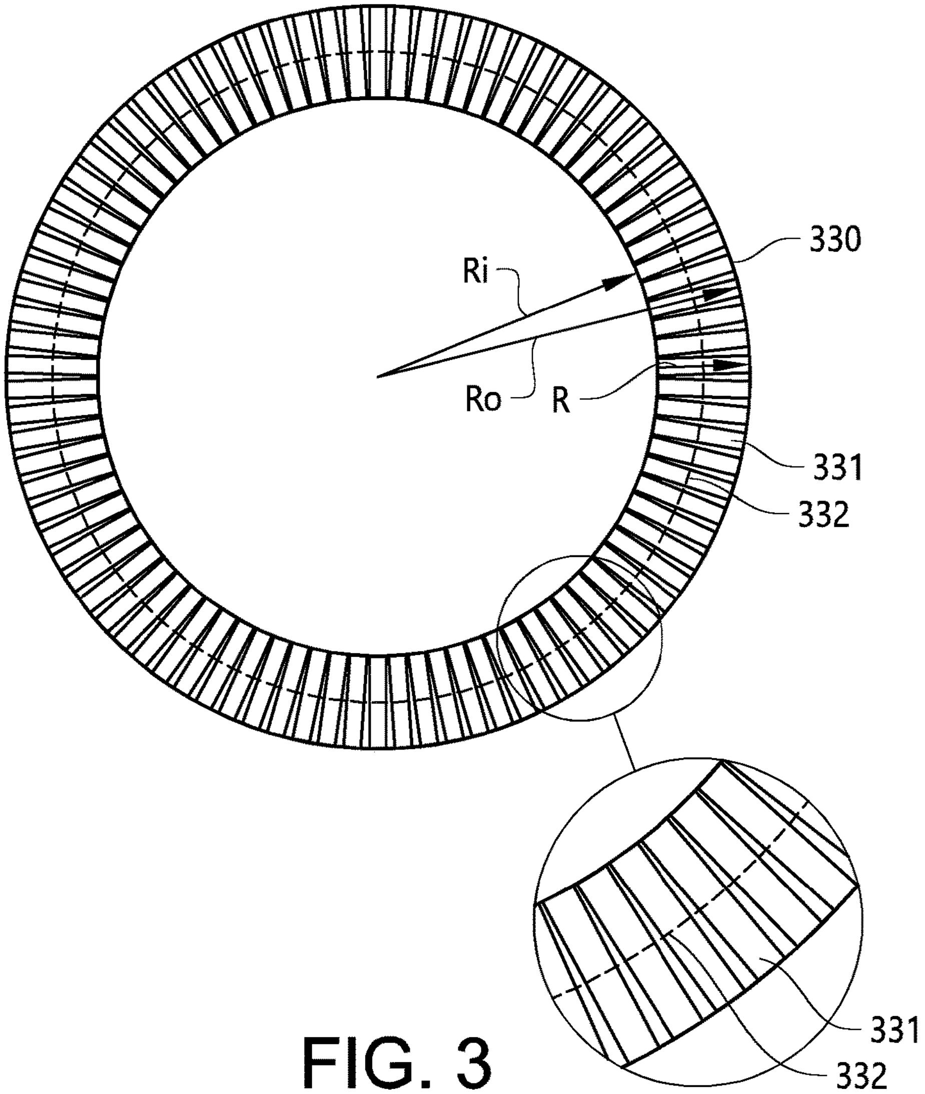
FIG. 3 shows a cross-section of a ring according to a variant of the present disclosure.

An example of a cross-section of a ring is shown and illustrated in FIG. 3. The ring 330 comprises a set of magnetic metal components 331. The magnetic metal components 331 are arranged such that a circular path 332 along the ring 330 around the winding axis intersects a plurality of the magnetic metal components 331. The magnetic metal components 331 may be laminated together. The ring 330 extends in a radial direction R from an inner radial portion Ri to an outer radial portion Ro.

The magnetic metal components 331 are electrically insulated from each other. This may be accomplished e.g., by the magnetic metal components being provided with an insulating layer before assembly of the ring. Alternatively, additional insulating components may be comprised in the ring. The magnetic metal components 331 are to be insulated primarily along a circumferential direction of the ring to be insulated from each other.

Figure 4:
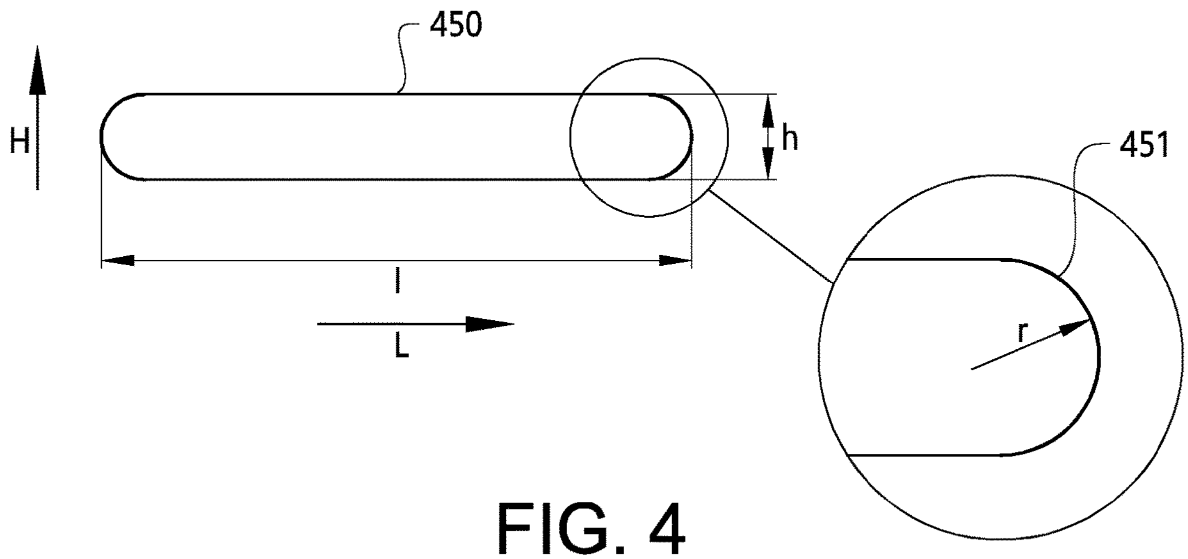
FIG. 4 shows a magnetic metal sheet of a variant of the present disclosure.

The set of magnetic metal components may comprise a plurality of magnetic metal sheets 331 as illustrated in FIG. 3. An example of a magnetic metal sheet comprised in a ring is shown in FIG. 4. Each magnetic metal sheet 450 is extending in a height direction H and having a magnetic metal sheet height h, extending in a length direction L and having a magnetic metal sheet length l and extending in a width direction W and having a magnetic metal sheet width, wherein the magnetic metal sheet width is smaller than each one of the magnetic metal sheet height and the magnetic metal sheet length.

Further, and as exemplified in FIG. 3, each magnetic metal sheet 331, 450 may be oriented in the ring 330 such that: the height direction coincides with the winding axis AW and the length direction extends from the inner radial portion Ri to the outer radial portion Ro of the ring 330. The width of the magnetic metal sheet 450 may be considered as the thickness of the magnetic metal sheet. The surface of such a magnetic metal sheet 450 may be covered by an insulating layer as mentioned in the above.

As illustrated in FIG. 3, each magnetic metal sheet 331, 450 may be oriented in the ring such that: the length direction L extends from the inner radial portion Ri to the outer radial portion Ro of the ring 330. Accordingly, in this case the magnetic metal sheets 450 extend all the way from the inner radius of the ring to the outer radius of the ring. As also illustrated in FIG. 3, the magnetic metal sheets 331, 450 may be oriented such that the length direction of the sheets each extend along a radial direction R of the ring.

Figure 5:
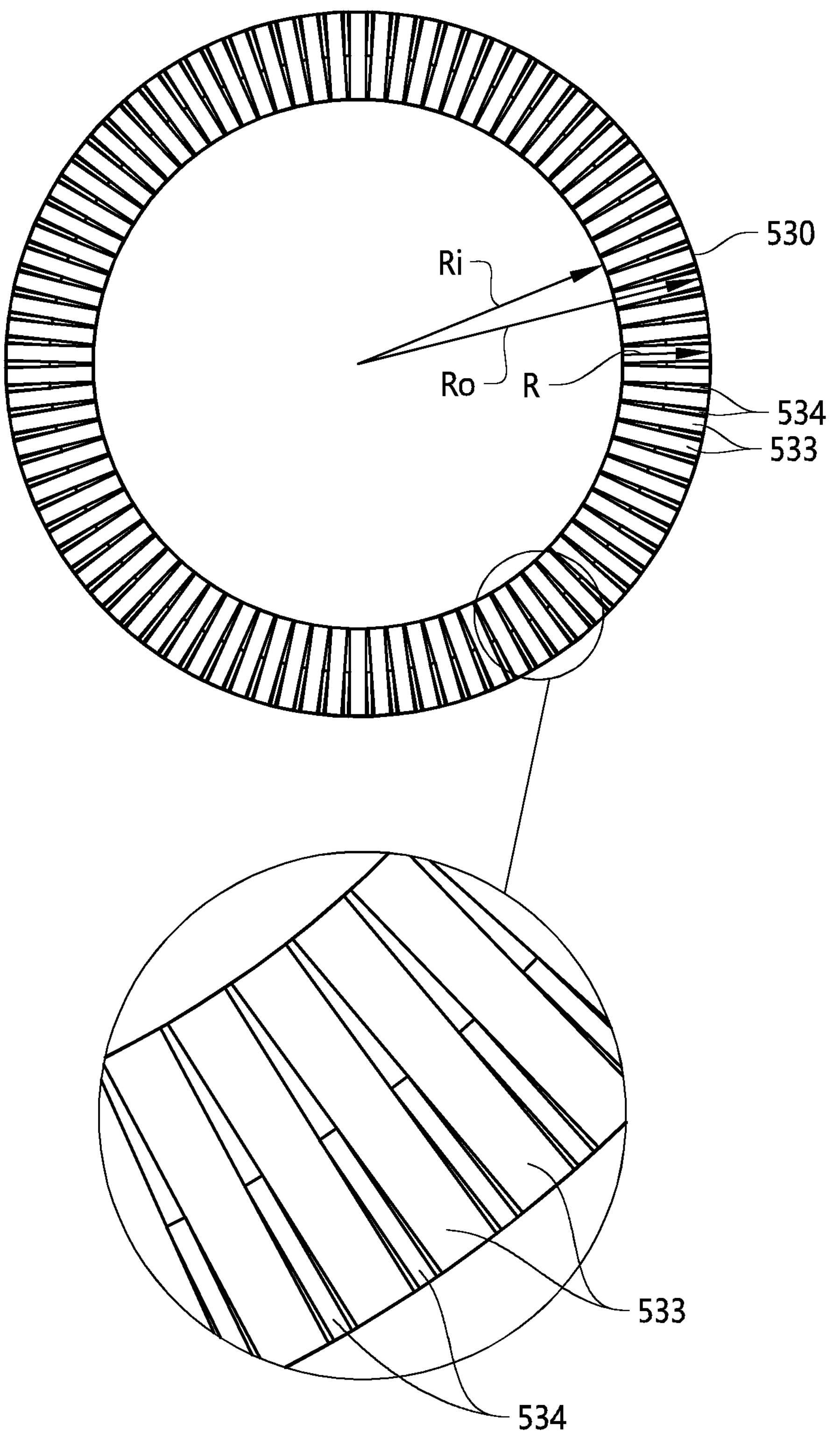
FIG. 5 shows a cross-section of another variant of a ring according to the present disclosure.

A further example of a cross-section of a ring 530 including magnetic metal sheets 533, 534 is shown in FIG. 5.

As illustrated in FIG. 5, a first subset of the magnetic metal sheets 533 may have a magnetic metal sheet length which extends from the inner radial portion Ri of the ring to the outer portion Ro of the ring.

A second subset of the magnetic metal sheets 534 may have a magnetic metal sheet length which do not extend from the inner radial portion Ri of the ring to the outer portion Ro of the ring.

As illustrated in FIG. 5, the subsets of magnetic metal sheets 533, 534 having different lengths may be arranged in an alternating relationship in the ring 530, so as to form a ring comprising a larger amount of magnetic material.

The magnetic metal sheets may have about the same width over the magnetic metal sheet, i.e., the magnetic metal sheet may have the same thickness over the magnetic metal sheet. This means that when the magnetic metal sheets are arranged in the ring and arranged so that the length direction L extends in the radial direction R there will be gaps between the magnetic metal sheets. The gaps between the magnetic metal sheets may be larger in the outer portion Ro of the ring. When using a second subset of the magnetic metal sheets, wherein the length of the second subset of the magnetic metal sheets are shorter, they may be used to fill up possible gaps formed between magnetic metal sheets. The second set of magnetic metal sheets may be arranged closer to the outer portion Ro of the ring.

In other, non-illustrated variants, the ring may comprise additional subsets of magnetic metal sheets, having different extensions between the inner radial portion of the ring and the outer portion of the ring. I.e., the additional subsets of magnetic metal sheets may have different lengths. For example, a ring comprising three or more subsets of magnetic metal sheets, wherein the magnetic metal sheets of each subset have a magnetic metal sheet length being different from the other subsets, may be formed.

Thus, magnetic metal sheets having different lengths may be used in order to fit into the ring and fill as much as possible of the volume of the ring with the magnetic metal sheets.

The magnetic metal components or magnetic metal sheets may be laminated with adhesive. This will keep the magnetic metal components or the magnetic metal sheets laminated and the magnetic metal sheets kept together. Further, the adhesive may fill any gap which might occur between the magnetic metal sheets due to the circular form of the ring and the magnetic metal sheets are arranged in the radial direction from the inner radial portion Ri to the radial outer portion Ro. The outer periphery at the outer radial portion Ro is longer than the inner periphery at the inner radial portion Ri which means that the magnetic metal sheets might not fill up the volume in the outer part of the ring as much as the magnetic metal sheets are filling up in the inner part of the ring.

Figure 6:
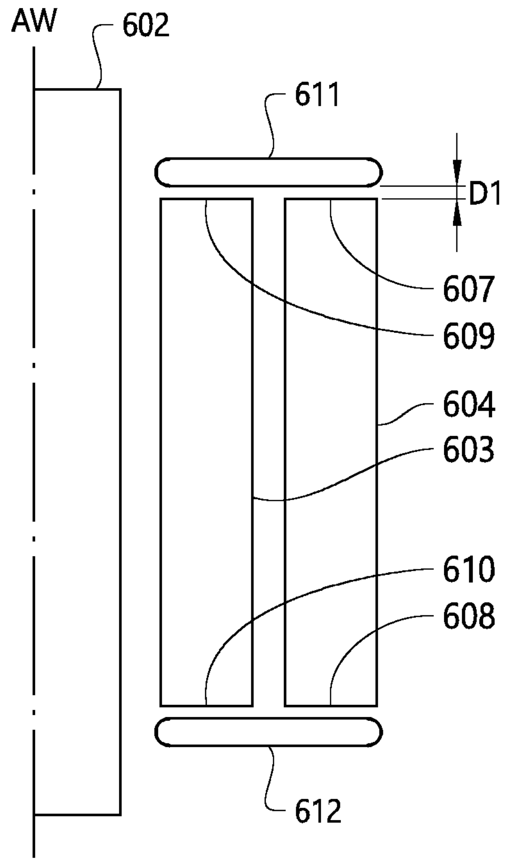
FIG. 6 shows a cross-section of a part of a second variant of a transformer according to the present disclosure.

FIG. 6 illustrates a second variant of a transformer comprising a first winding 604 and a second winding 603. A cross-section of a half of a core 602, a first winding 604 and a second winding 603 is shown in 6. The core 602, the first winding 604 and the second winding 603 are symmetrical around a central axis. The windings 603, 604 are wound around a winding axis AW, coinciding with the central axis. A first end of the first winding 604 is terminating in an axial end surface 607 of a first winding 604 extending in a direction perpendicular to the winding axis AW. A first end of the second winding 603 is terminating in an axial end surface 609 of a second winding extending in a direction perpendicular to the winding axis AW. A ring 611 is arranged such that a projection of the ring 611, along the winding axis AW, onto the winding, covers at least a part of, preferably all of, the axial end surface 607 of the first winding 604 and further covers at least a part of, preferably all of, the axial end surface 609 of the second winding 603. By the ring covering both the first winding 604 and the second winding 603 the noise reduction may be even more effective.

As illustrated in FIG. 6, a first opposing ring 612 may be arranged at the other end of the first winding 604 and the second winding 603, such that a projection of the first opposing ring 612 covers at least a part of, preferably all of, the opposing axial end surface 608 of the first winding 604 and further covers at least a part of, preferably all of, the opposing axial end surface 610 of the second winding 603.

Figure 7:
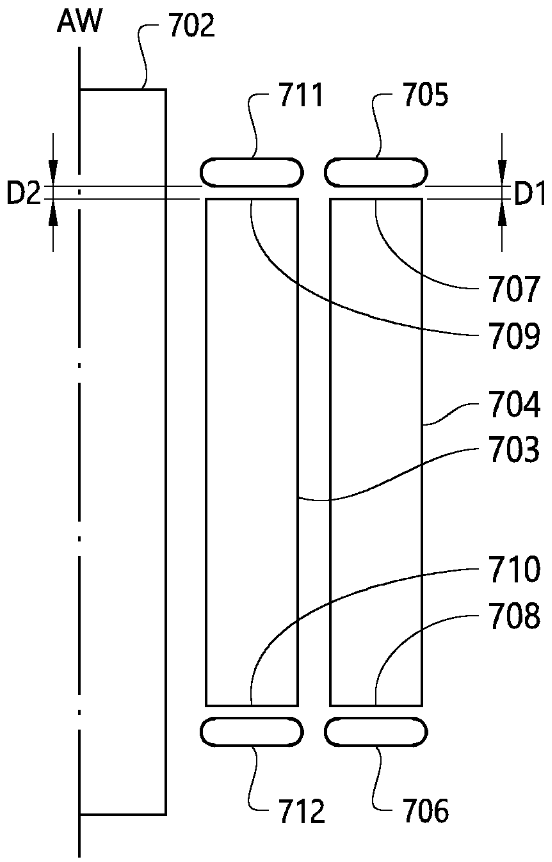
FIG. 7 shows a cross-section of a part of a third variant of a transformer according to the present disclosure.

In FIG. 7, a third variant of a transformer having a first winding 704 and a second winding 703 is shown. The transformer comprises a first ring 705, comprising magnetic material, the ring 705, being located outside the first winding 704, and adjacent to the axial end surface 707, wherein a projection of the ring 705 of the first winding, along the winding axis AW, onto the first winding 704, covers at least a part of, preferably all of, the axial end surface 707 of the first winding. Further the transformer described in FIG. 7 comprises a second ring 711, comprising magnetic material, the second ring 711 being located outside the second winding 703, and adjacent to the axial end surface 709, wherein a projection of the second ring 711, along the winding axis AW, onto the second winding 703, covers at least a part of, preferably all of, the axial end surface 709 of the second winding.

In the figure, a first opposing ring 706 is arranged at a second end of the first winding 704, and a second opposing ring 712 is arranged at a second end of the second winding 703 in a similar manner as described in the above for the first ends of the windings 703, 704. However, in other variants of a transformer, there might be a ring arranged close to only one end of the windings.

The transformer may thus comprise a ring 705 arranged adjacent to the axial end surface 707 on the upper part of the first winding 704 and an opposing ring 706 arranged adjacent to the axial end surface 708 of the lower part of the first winding. In the same manner the transformer may comprise a ring 711 arranged adjacent to the opposing axial end surface 709 on the upper part of the second winding 703 and an opposing ring 712 arranged adjacent to the opposing axial end surface 710 of the lower part of the second winding.

The ring may be arranged at a distance D1, D2 from an axial end surface of the winding. The distance D1 and D2 may be applied to any of the rings described herein and it is shown in the figures. The distance D1, D2 may be below 10 mm. Alternatively the distance D1, D2 may be 0.2 to 10 mm.

Figure 13:
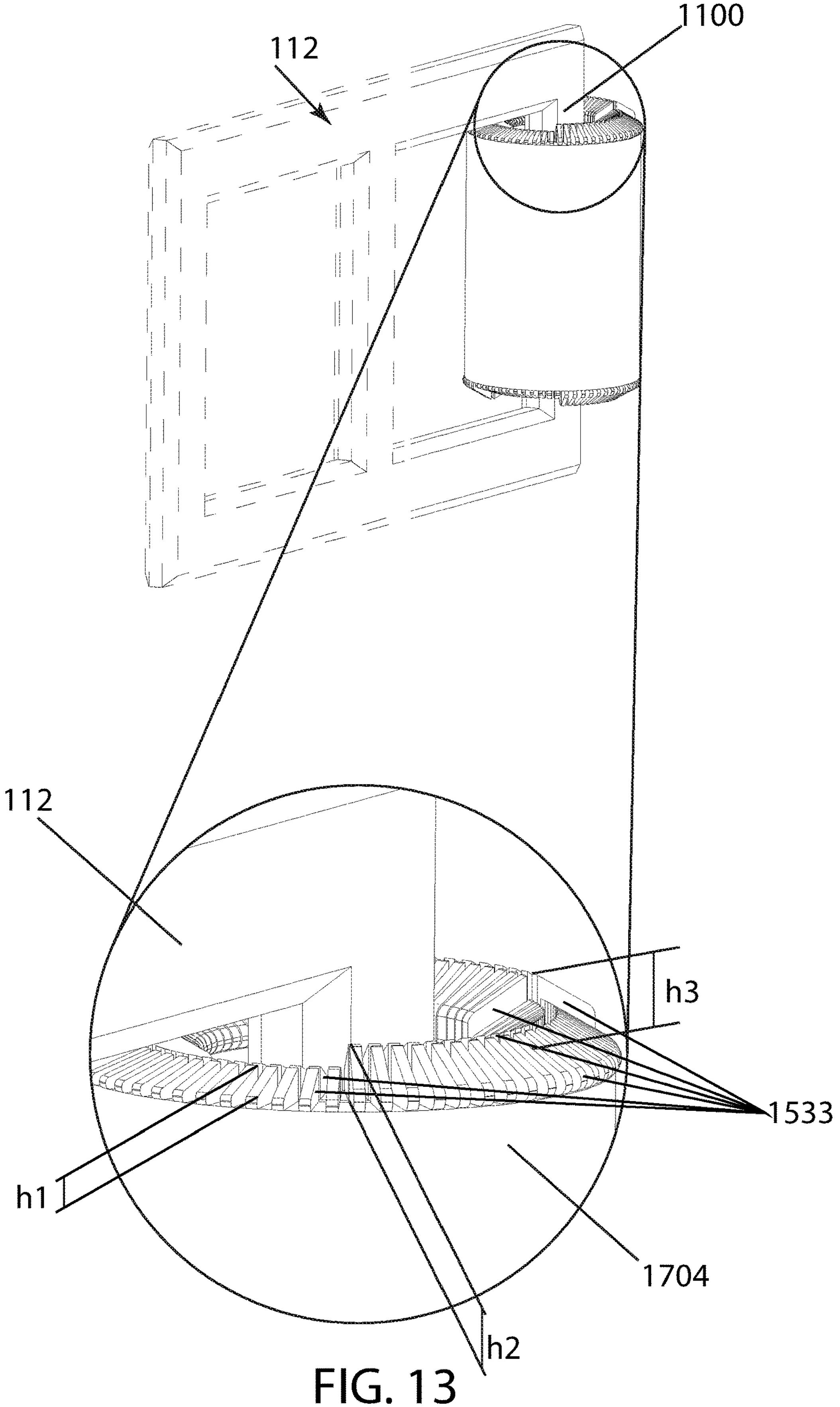
FIG. 13 show a perspective view of a portion of a transformer according to a further embodiment. The design of the transformer is similar to the transformer shown in FIG. 7, but with rings which vary in height along their circumference.
Figure 14:
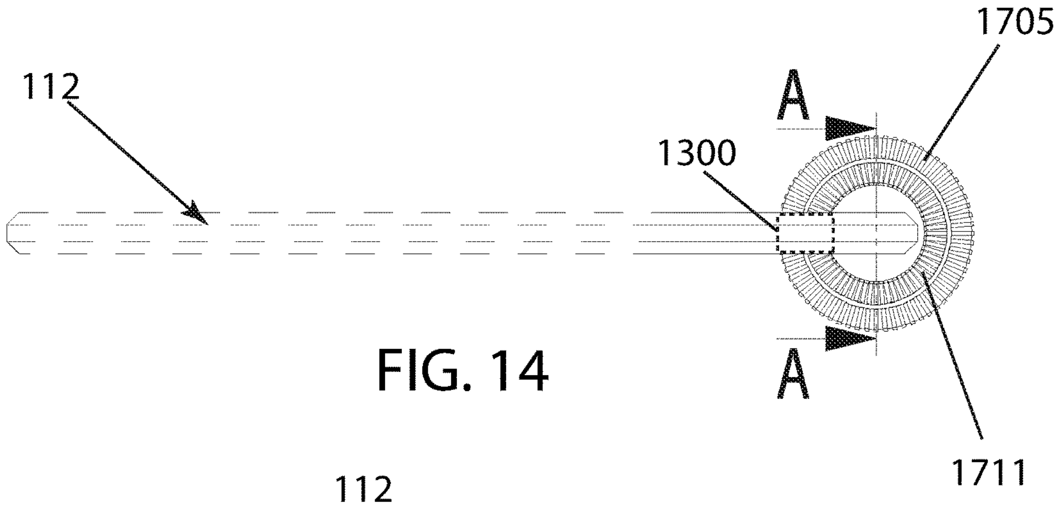
FIG. 14 show a top view of the transformer also shown in FIG. 13, indicating the position of cross-section A-A.
Figure 15:
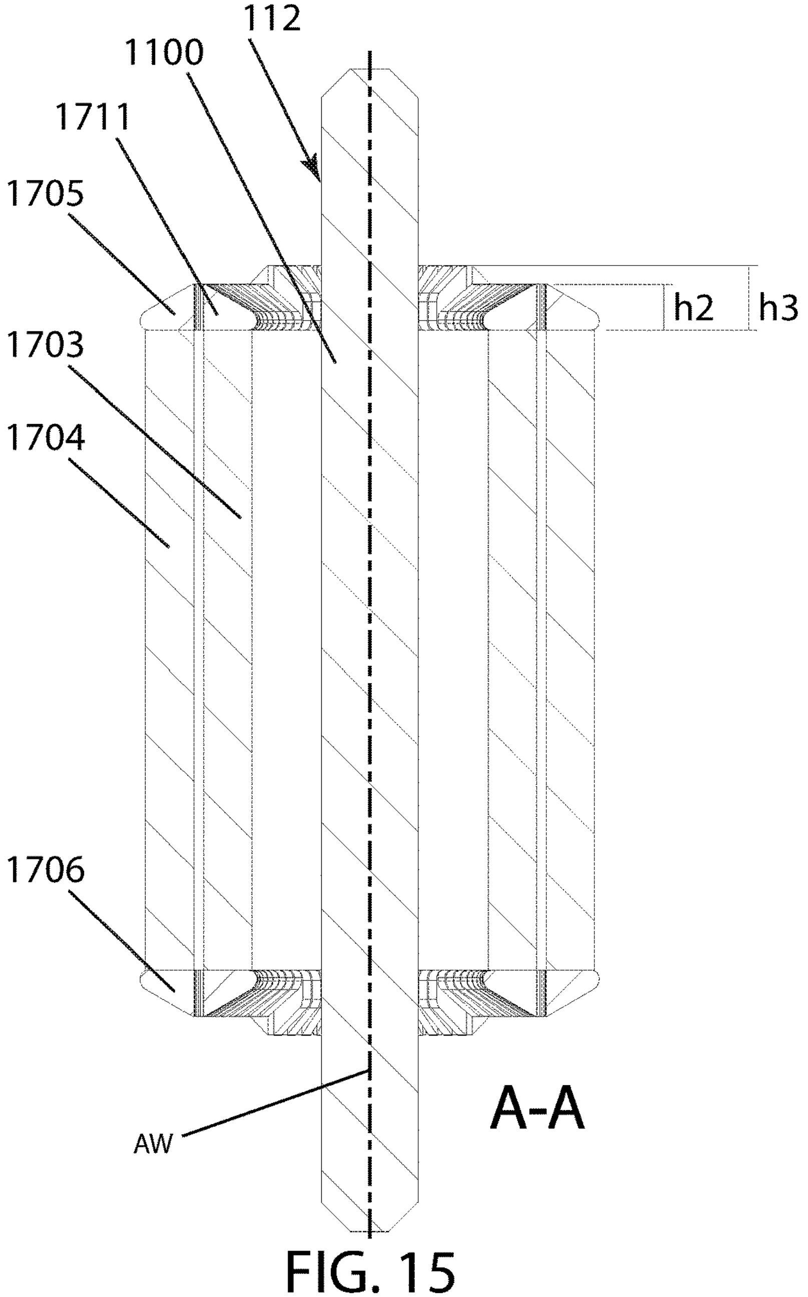
FIG. 15 a cross-sectional view in section A-A of the transformer also shown in FIGS. 13-14.

The transformer 1000 shown in FIGS. 13-15 illustrate an aspect of the present disclosure which is applicable also to transformers according to other embodiments described herein. A teaching of this aspect is to configure the ring(s) to have different cross-sectional height of the ring (thus different height of the magnetic metal components of the ring) at different positions around the respective ring (different positions about the winding axis).

The height at each position is adapted to reduce reluctance so that leakage flux is better guided to the limb and yoke 1200 than to any other magnetic structure around the windings. In the present embodiment, the magnetic metal components come in three different variants, each with a different height. In other embodiments, each magnetic metal component may be uniquely shaped and sized. Typically, the difference between the lowest height and the highest height of the magnetic metal components is at least 10%, such as 100 mm height of the lowest magnetic metal component and 110 mm height of the highest magnetic metal component, but in the present embodiment the difference is greater, as shown in the figures.

In the illustrated embodiment, the magnetic metal components 331, 533, 534, 1533 are provided in three different shapes/heights, with the ones of lowest height provided between the respective winding and the yoke 1200. In other embodiments, there may be any number of different heights of the magnetic metal components as long as there are at least two different heights.

Figure 16A:
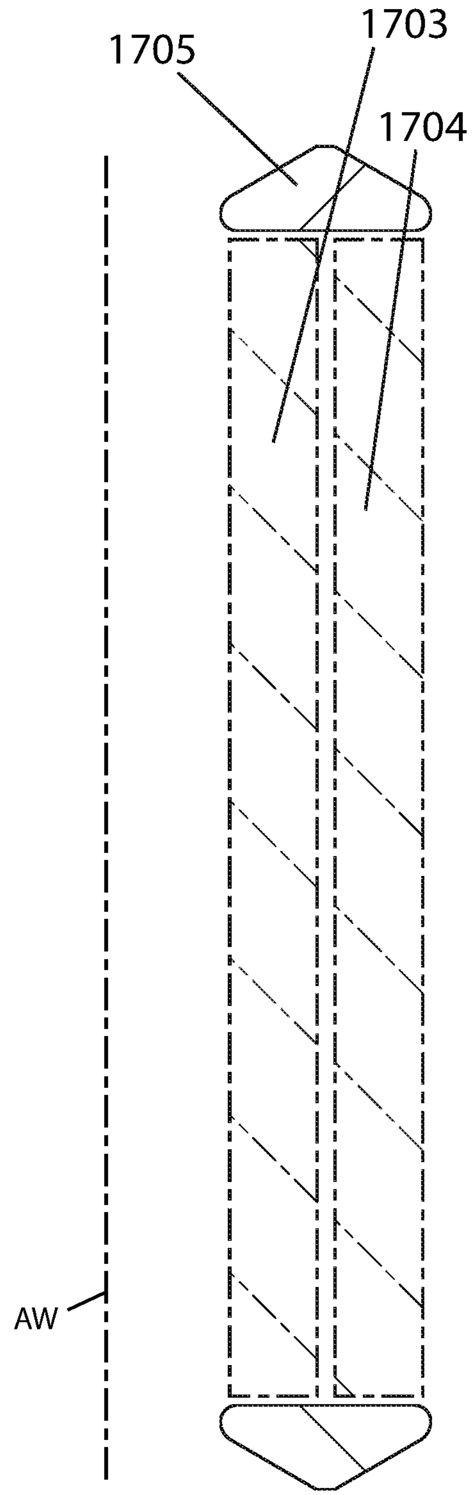
FIGS. 16*a*-*b* are cross sectional views showing alternative embodiments of the cross-sectional shape of the rings in cross-section A-A.
Figure 16B:
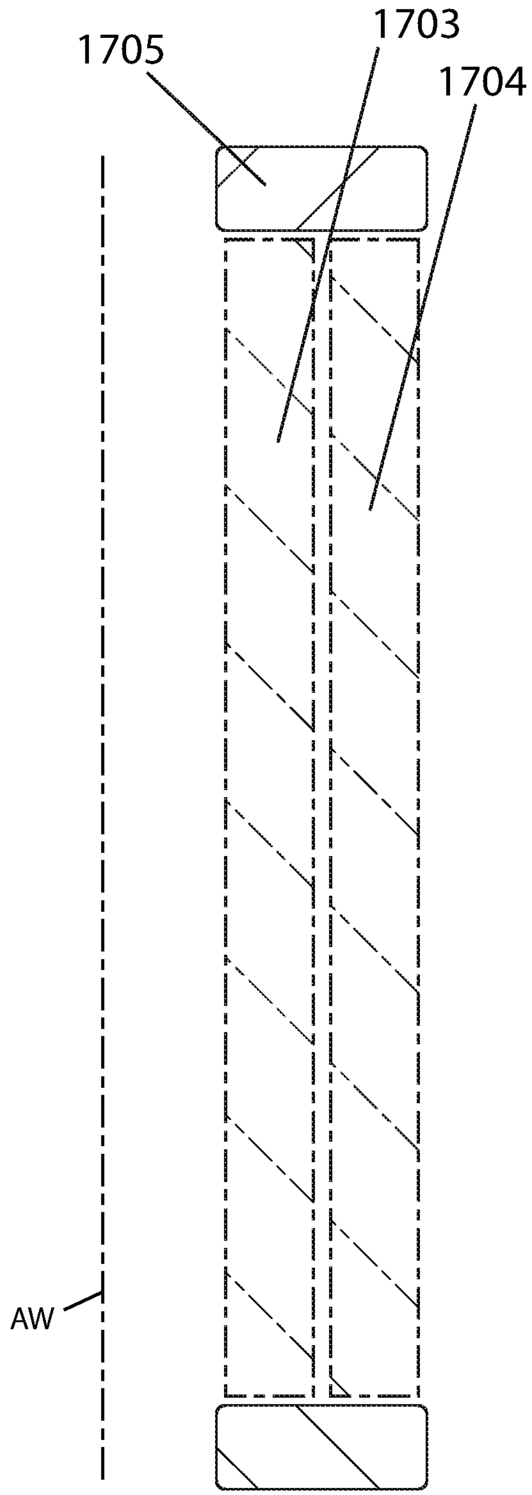

A further teaching is to use varying cross-sectional shape of the ring, as seen in a cross-section extending in radial direction with respect to the winding axis AW. Different cross-sectional shapes of the ring(s) are schematically shown in FIGS. 15 and 16*a-b*.

FIG. 4 illustrates a magnetic metal sheet 450. The magnetic metal sheet has been described above. Further, a magnetic metal sheet 450 may have the same shape as a cross-section, of a ring of magnetic material, in a direction coinciding with the winding axis.

The ring may thus have a cross-section in a direction coinciding with the winding axis which has the same shape as a magnetic metal sheet of FIG. 4. As can be illustrated in FIG. 4, the outer periphery 451 as seen in such a cross-section is rounded. FIG. 4 shows a magnetic metal sheet, but the ring may, as mentioned here, have the same cross-section as some of the magnetic metal sheets. The outer periphery of a ring as described herein and/or in accordance with any one of the illustrated examples may have a rounded outer periphery as may be illustrated in FIG. 4.

The cross-section of a ring in the outer periphery in the direction coinciding with the winding axis has a radius r (shown in enlarged part of FIG. 4) on the outer periphery of a ring. The electrical field is strong where radius of curvature is small Sharp corners may for example be a source of electrical field. When using a ring as disclosed herein with a rounded shape it may have a radius larger than a radius of a corner of a winding. Thus, it will decrease the electrical field.

The rounded form is thus advantageous. The outer portion of the ring may be achieved by, after that the magnetic ring is made and hardened, the ring is machine worked to make the shape suitable for insulation design. Another way to obtain a rounded or smoothed outer ring radius portion could be to cut each magnetic metal sheet with curved edges with the desired rounded shape, e.g., with a radius as desired, and stack them together.

The ring may be arranged so as to have the same potential as the corresponding winding. To this end, conductive components such as copper components or copper sheets may be included between the magnetic metal components or magnetic metal sheets, and the copper components or copper sheets may be connected electrically to conductors on the winding ends. The ring and the winding will then have the same potential, thus, they will be equipotential.

If the winding is a stack winding, the magnetic ring may be equipotential with the upper disc of the winding. This further means that the distance between the magnetic ring and the upper disc of the winding may be relatively short. The aim is to shape the electric field line in order to improve the insulation design of the windings.

Although not depicted in the drawings, a conductive layer, such as an aluminium or copper layer may enclose the ring. Further, an electrically insulation layer may enclose the aluminium or copper layer.

The winding may for example be a disc winding. A disc winding is especially sensitive for vibrations and therefore the rings as proposed herein may be particularly useful for a disc winding.

As discussed in the above, by the features proposed herein the reliability may be increased, noise may be reduced and the radial eddy current losses may be lowered. This further means that the cost may be lowered. Further, the insulation design may be improved.

A preliminary simulation has been done on a two-winding transformer:

| | | | |
|---|---|---|---|
| Power | (MVA) | 42.700 | 42.700 |
| Voltage | (kV) | 50.000 | 16.200 |

The results are very promising. The good point is that the idea works very well even the magnetic shield ring is saturated. Therefore, it can work for both normal load condition and under short-circuit condition.

In the results from the simulation, it was also found that the ring of magnetic material which was put on the ends of the high voltage winding reduces the axial force on the low voltage winding too. Further, it also reduces the eddy losses of the low voltage winding.

Figure 8:
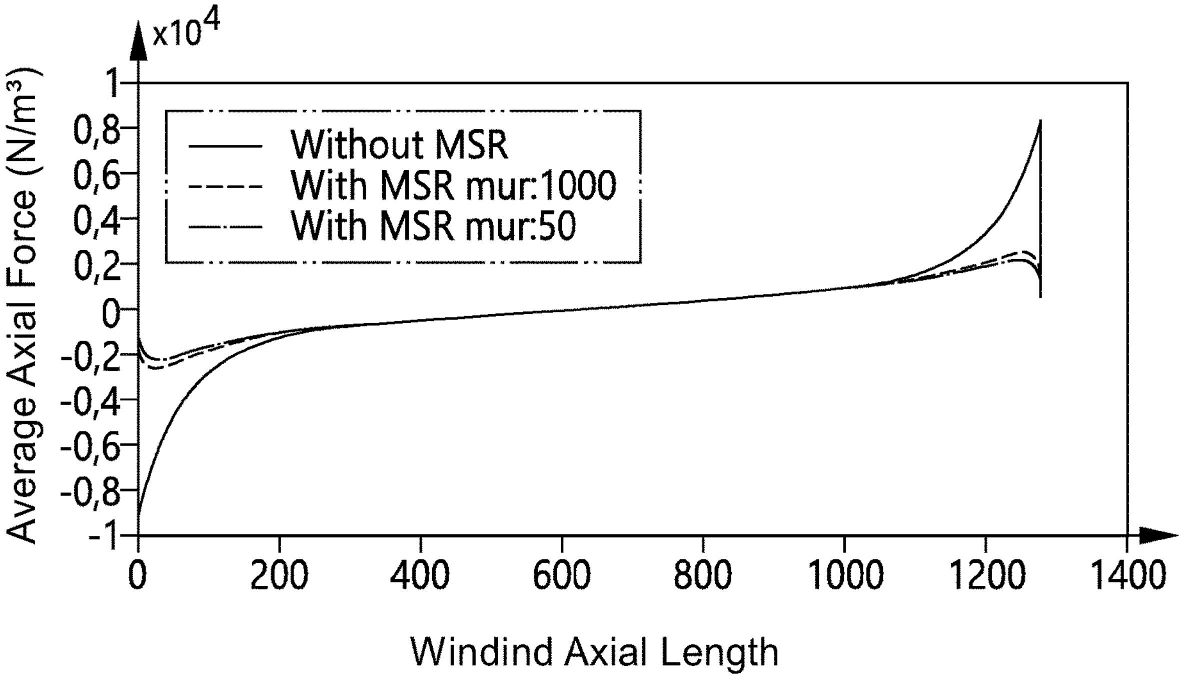
FIG. 8 is a graph showing the average axial force for an example of a transformer according to the present disclosure.

FIG. 8 shows a graph where it can be seen that the axial force is large at the ends of the windings when not having a ring of magnetic material. The axial force is reduced when a ring of magnetic material is used. MSR in FIG. 8 means magnetic shield ring which is mainly referred to as the magnetic ring herein. Mur is the relative magnetic permeability. The winding axial length is in mm.

Figure 9:
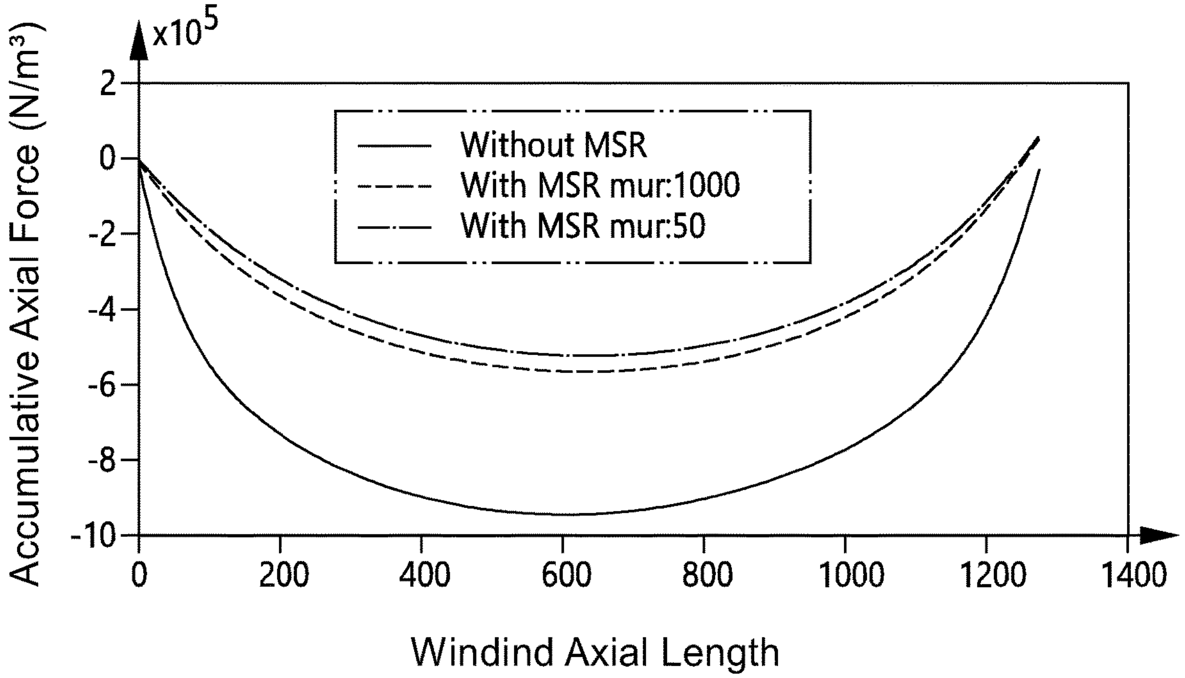
FIG. 9 is a graph showing the accumulative axial force for an example of a transformer according to the present disclosure.

FIG. 9 shows a graph where it can be seen that the variation of the accumulative axial force over the length of the windings is greater when not having a ring of magnetic material as compared to when having a ring of magnetic material. MSR in FIG. 9 means magnetic shield ring which is mainly referred to as the magnetic ring herein. Mur is the relative magnetic permeability. The winding axial length is in mm.

Figure 10A:
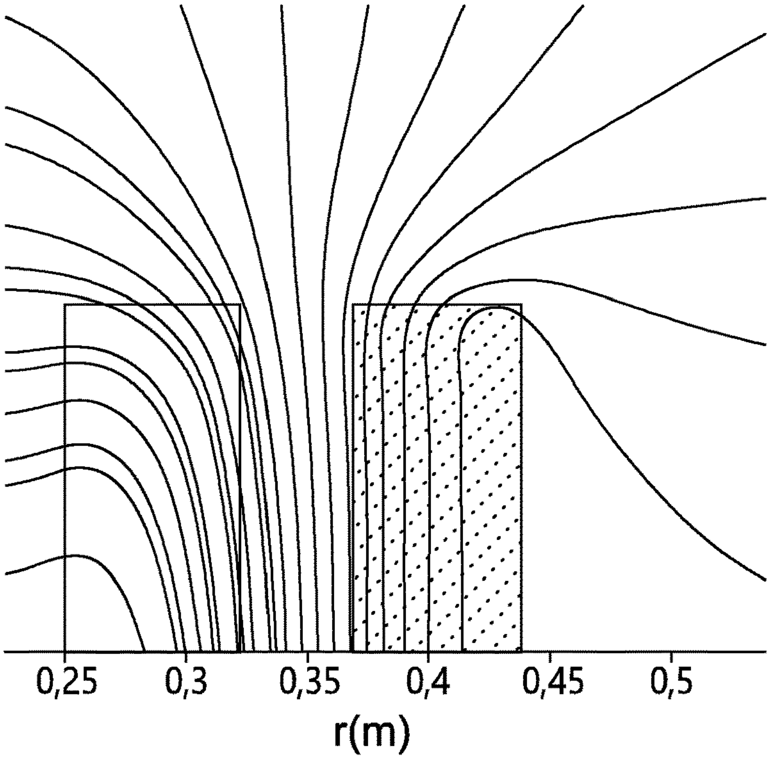
FIG. 10*a* shows a winding current loss distribution in a winding for an example of a prior art transformer.
Figure 10B:
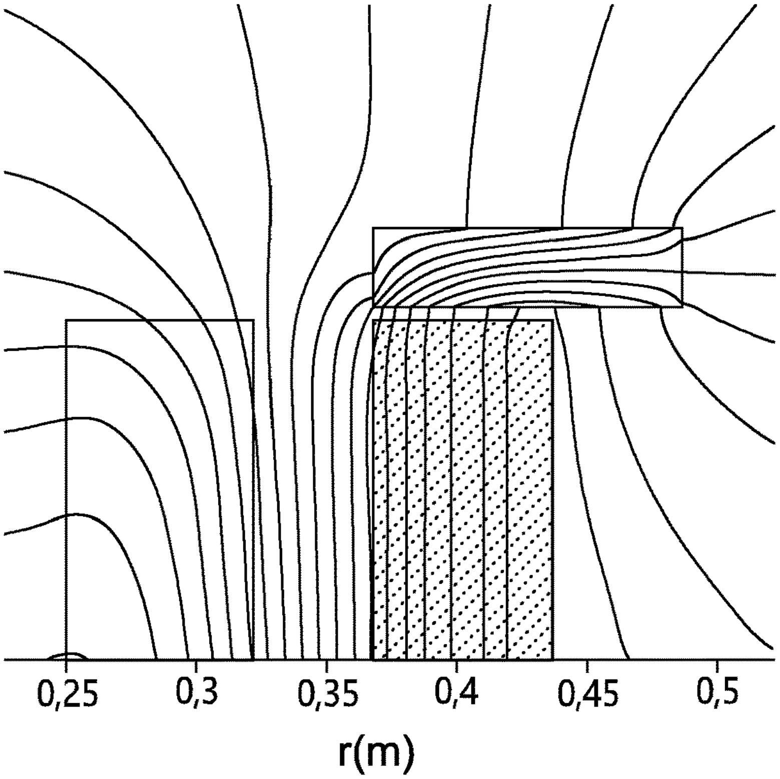
FIG. 10*b* shows a winding current loss distribution in a winding for a transformer as in FIG. 10*a* when provided with a ring of magnetic material in accordance with the present disclosure.

An effect of the ring of magnetic material is also shown in FIGS. 10*a* and 10*b*, wherein a foil winding has been modelled. In FIG. 10*a*, no ring is used, while in FIG. 10*b*, a ring of magnetic material is being used. In FIGS. 10*a* and 10*b*, the core limb is to the left (not depicted), followed by an inner winding shown as a rectangle to the left, and an outer winding shown as a rectangle to the right. In this case, the outer winding is a Higher Voltage Winding and the inner winding is a Lower Voltage Winding. The impact of a ring of magnetic material on top of the outer winding is investigated, and the resulting flux is illustrated by flux lines. As may be seen by comparing FIGS. 10*a* and 10*b*, the shape of the flux lines is altered by the presence of the ring. Also, in this particular case the total winding loss in the outer winding carrying the ring was reduced by 20%.

Figure 11:
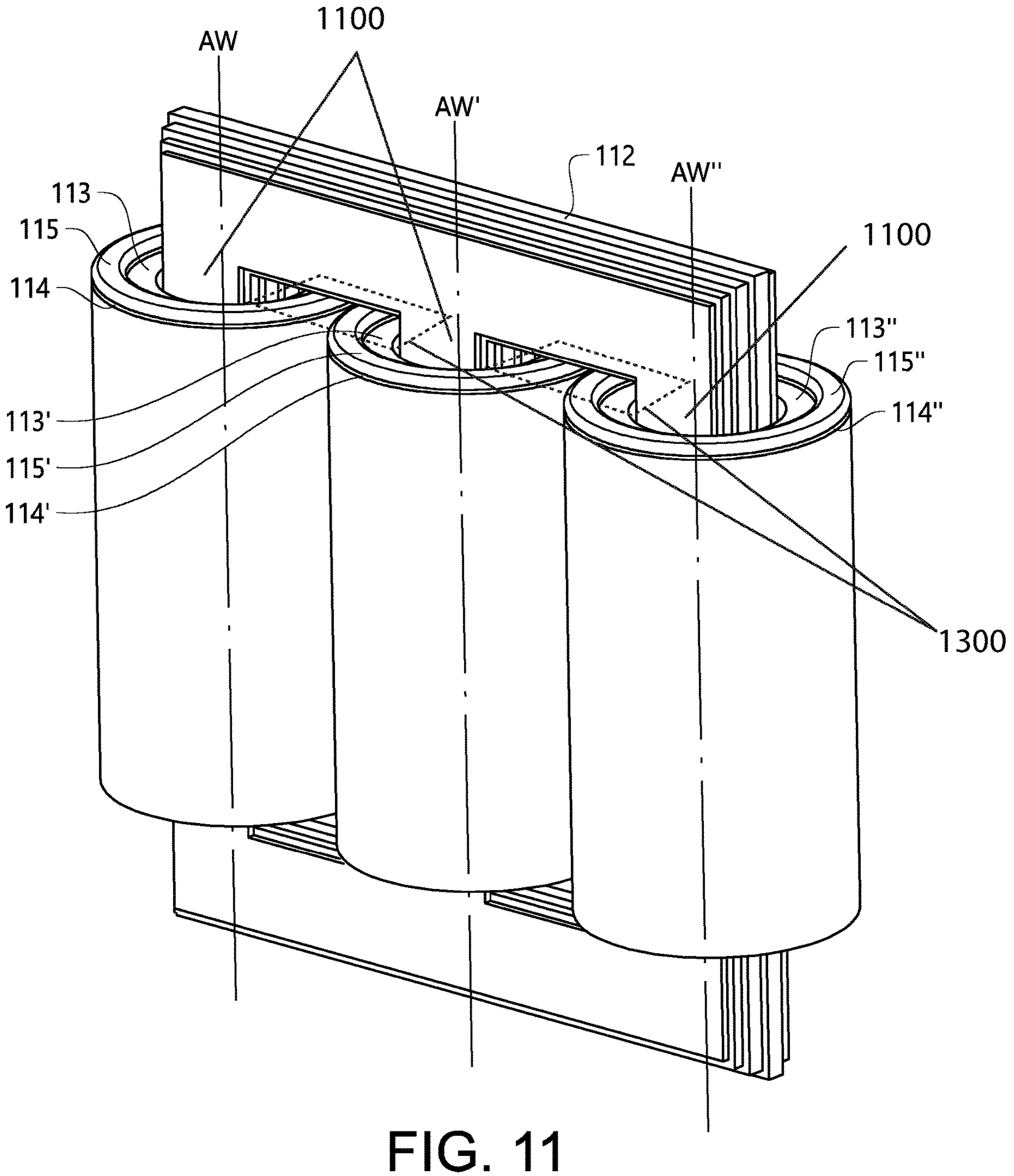
FIG. 11 illustrates an example of a transformer with a plurality of windings arranged around a plurality of corresponding winding axes around the same core and comprising rings according to a variant of the of the present disclosure.

For completeness, FIG. 11 illustrate a variant of a transformer where the core 112 forms a plurality of legs, each leg forming a winding axis AW, AW', AW". for the windings around each leg of the core. In the illustrated variant, a first winding 114, 114', 114" and a second winding 113, 113', 113" are coaxially wound around each winding axis AW, AW', AW". Accordingly, the transformer comprises at least one winding wound around each out of a plurality of windings axes AW, AW', AW", in this case a plurality of windings 114, 114', 114", 113, 113', 113" would around a plurality of corresponding winding axis AW, AW', AW". Naturally, the features and advantages as described herein with reference to a transformer with only one winding axis may be similarly applied to a transformer having several winding axes. The rings 115, 115', 115" can be seen arranged above the first windings 114, 114', 114."

Figure 12:
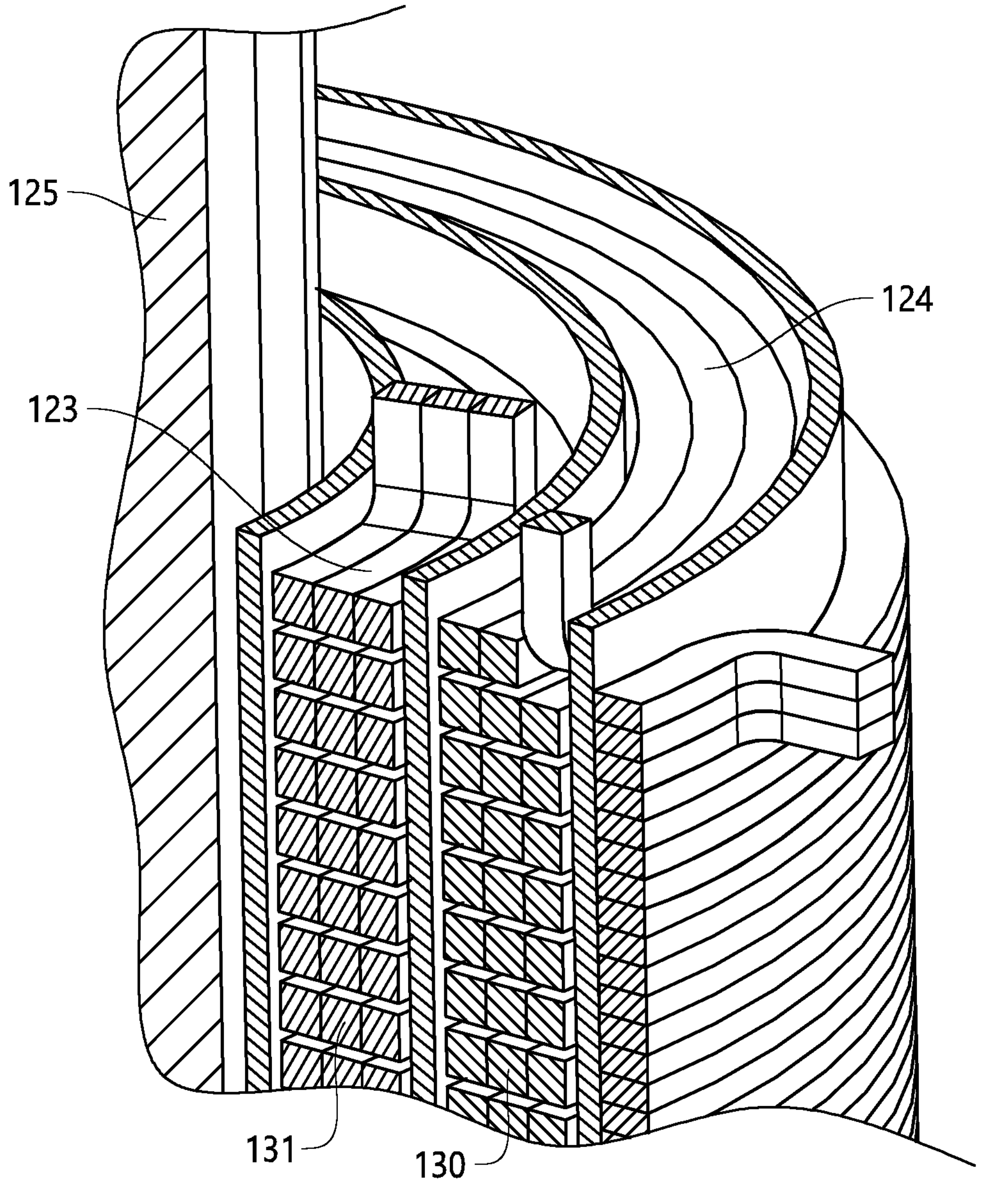
FIG. 12 illustrates an example of a type of winding which may be used in a transformer.

FIG. 12 illustrates a sectional view of a part of a core 125 and a first winding 124 and a second winding 123. The magnetic rings as disclosed herein may for example be used with a transformer comprising this kind of winding. Winding threads 130 of the first winding 124 and winding threads 131 of the second winding 123 are illustrated.

Optionally, and as in the illustrated variants, the second winding and the first winding are coaxially arranged such that one of the windings is radially inside the other winding. Naturally, the rings as described herein may be applied also in situations where e.g., a first and a second winding are wound around the same winding axis, but with an axial distance between them. In that case, a ring or rings may be applied to one or both of the axial ends of each winding.

In view of the above, it will be understood that the features as proposed herein may be applied to a large variety of transformers and transformer designs.

The invention claimed is:

1. A transformer comprising:

a core; and at least one winding wound around a winding axis extending along a limb of the core, said winding terminating in an axial end surface extending in a direction perpendicular to said winding axis, said transformer comprising a ring comprising magnetic material, said ring being located outside said winding and adjacent to said axial end surface, wherein a projection of said ring, along said winding axis, onto said winding, covers at least a part of, preferably all of, said axial end surface, wherein the core comprises a yoke, said yoke extending radially across the ring, at one or more crossing locations, from a radial inside of the ring to a radial outside of the ring, wherein said ring comprises a set of magnetic metal components, said magnetic metal components being distributed about the winding axis and electrically insulated from each other, wherein heights along the winding axis of respective ones of the magnetic metal components varies about the winding axis such that magnetic metal components at the crossing location(s) have lower height along the winding axis than the heights of magnetic metal components further away from the crossing location(s).

2. A transformer according to claim 1, wherein the magnetic metal components are electrically conductive.

3. A transformer according to claim 1, wherein the heights of the magnetic metal components such that leakage flux is guided to the limb and yoke rather than to any other magnetic structure around each respective magnetic metal component.

4. The transformer according to claim 1, wherein said ring comprises a plurality of magnetic metal sheets, each magnetic metal sheet extending in a height direction and having a magnetic metal sheet height, extending in a length direction and having a magnetic metal sheet length and extending in a width direction and having a magnetic metal sheet width, wherein said magnetic metal sheet width is smaller than each one of said magnetic metal sheet height and said magnetic metal sheet length, said ring extending in a radial direction from an inner radial portion to an outer radial portion of said ring, each magnetic metal sheet being oriented in said ring such that: said height direction coincides with said winding axis and said length direction extends along a direction from said inner radial portion to said outer radial portion of said ring.

5. The transformer according to claim 4, wherein each magnetic metal sheet being oriented in said ring such that: said length direction extends along said radial direction.

6. The transformer according to claim 4, wherein at least the magnetic metal sheets of a first subset of the magnetic metal sheets have a magnetic metal sheet length which extends from the inner radial portion of said ring to the outer portion of said ring).

7. The transformer according to claim 6, wherein the metal steel sheets of a second subset of the magnetic metal sheets have a magnetic metal sheet length which does not extend from the inner radial portion of said ring to the outer portion of said ring.

8. The transformer according to claim 1, wherein said ring has an outer periphery having a cross-section in a direction coinciding with said winding axis which is rounded.

9. The transformer according to claim 1, wherein said ring comprises conductive elements being electrically connected to said winding.

10. The transformer according to claim 1, wherein an electrically conductive layer encloses said ring.

11. The transformer according to claim 10, wherein an electrical insulation layer encloses said electrically conductive layer.

12. The transformer according to claim 1, wherein said winding also terminates in an additional axial end surface opposite to said axial end surface as seen along said winding axis, and said transformer comprises an opposing ring comprising magnetic material, said opposite ring being located outside said winding and adjacent to said additional axial end surface, wherein a projection of said ring, along said winding axis, onto said winding, covers at least a part of said additional axial end surface.

13. The transformer according to claim 1, wherein said winding is a first winding and the transformer further comprises a second winding wound around said winding axis, said second winding terminating in an axial end surface of the second winding extending in a direction perpendicular to said winding axis.

14. The transformer according to claim 13, wherein a projection of said ring, along said winding axis, onto said second winding, covers also at least a part of said axial end surface of the second winding.

15. The transformer according to claim 13, wherein said ring is a first ring and the transformer comprises a second ring comprising magnetic material, said second ring being located outside said second winding and adjacent to said axial end surface of the second winding, wherein a projection of said second ring, along said winding axis, onto said second winding, covers at least a part of, preferably all of, said end surface of the second winding.

16. The transformer according to claim 13, wherein a projection of said ring, along said winding axis, onto said second winding, covers also all of said axial end surface of the second winding.

17. The transformer according to claim 12, wherein a projection of said ring, along said winding axis, onto said winding, covers all of said additional axial end surface.

18. The transformer according to claim 9, wherein said conductive elements are arranged between said magnetic metal components or magnetic metal sheets.

19. The transformer according to claim 18, wherein said conductive elements are copper elements or copper sheets.

20. The transformer according to claim 10, wherein the electrically conductive layer comprise an aluminium or a copper layer.

* * * * *